United States Patent
Miura et al.

(10) Patent No.: US 8,515,657 B2
(45) Date of Patent: Aug. 20, 2013

(54) INFORMATION PROVIDING DEVICE, INFORMATION PROVIDING METHOD AND COMPUTER-READABLE STORAGE MEDIUM

(75) Inventors: Naoki Miura, Toyokawa (JP); Junichi Nonomura, Okazaki (JP)

(73) Assignee: Aisin AW Co., Ltd., Aichi-ken (JP)

( * ) Notice: Subject to any disclaimer, the term of this patent is extended or adjusted under 35 U.S.C. 154(b) by 149 days.

(21) Appl. No.: 13/175,082

(22) Filed: Jul. 1, 2011

(65) Prior Publication Data
US 2012/0041671 A1    Feb. 16, 2012

(30) Foreign Application Priority Data
Aug. 5, 2010    (JP) .................................. 2010-176214

(51) Int. Cl.
*G01C 21/00*    (2006.01)
(52) U.S. Cl.
USPC .......... 701/200; 701/201; 701/202; 701/209; 701/411; 701/420; 701/424; 701/428; 705/7.26; 709/238; 725/4; 370/254
(58) Field of Classification Search
USPC ................. 701/200, 201, 202, 209, 411, 420, 701/424, 428; 705/77.26; 709/238; 725/4; 370/254
See application file for complete search history.

(56) References Cited

U.S. PATENT DOCUMENTS

| 5,265,006 | A | * | 11/1993 | Asthana et al. | 705/7.26 |
| 5,919,246 | A | * | 7/1999 | Waizmann et al. | 701/424 |
| 5,931,888 | A | * | 8/1999 | Hiyokawa | 701/428 |
| 6,278,941 | B1 | * | 8/2001 | Yokoyama | 701/420 |
| 7,136,744 | B2 | * | 11/2006 | Maeda | 701/411 |
| 2004/0172189 | A1 | * | 9/2004 | Maeda | 701/200 |
| 2005/0043884 | A1 | * | 2/2005 | Atarashi | 701/202 |
| 2005/0055459 | A1 | * | 3/2005 | Bamba | 709/238 |
| 2005/0183109 | A1 | * | 8/2005 | Basson et al. | 725/4 |
| 2007/0008905 | A1 | * | 1/2007 | Berger et al. | 370/254 |
| 2009/0005976 | A1 | * | 1/2009 | Hayashi | 701/209 |
| 2010/0114474 | A1 | * | 5/2010 | Suganuma et al. | 701/200 |
| 2011/0288765 | A1 | * | 11/2011 | Conway | 701/201 |

FOREIGN PATENT DOCUMENTS
JP    2005-163584 A    6/2005

* cited by examiner

*Primary Examiner* — James Trammell
*Assistant Examiner* — Sanjeev Malhotra
(74) *Attorney, Agent, or Firm* — Sughrue Mion, PLLC (57) ABSTRACT

An information providing device, having a route acquisition unit that acquires a reference travel route between two points, a route finding unit that finds a fuel-saving travel route between the two points, a fuel cost calculating unit that calculates a difference in cost of fuel between the reference travel route and the fuel-saving travel route based on fuel consumption and a fee of fuel, a communication cost calculating unit that calculates a communication cost concerning the fuel-saving travel route, and a control unit that executes control for transmitting predetermined information to a terminal device based on the result of a comparison between the difference in cost of fuel and the communication cost.

8 Claims, 7 Drawing Sheets

| REGION | FUEL PRICE |
|---|---|
| XX CITY YY TOWN | 132 YEN |
| ZZ CITY XY TOWN | 128 YEN |
| XZ CITY YZ TOWN | 134 YEN |
| ⋮ | ⋮ |

SAVABLE FUEL COST    15 YEN
COMMUNICATION COST   18 YEN

DOWNLOAD FUEL-SAVING TRAVEL ROUTE ?

YES    NO

FIG.6

| TWO POINTS | | FUEL-SAVING TRAVEL ROUTE | | |
|---|---|---|---|---|
| START POINT | END POINT | ROUTE INFORMATION | SAVED FUEL COST | COMMUNICATION COST |
| x1,y1 | x2,y2 | RECEIVED | 24 YEN | 15 YEN |
| x3,y3 | x4,y4 | NOT RECEIVED | 15 YEN | 18 YEN |
| ⋮ | ⋮ | ⋮ | ⋮ | ⋮ |

INFORMATION PROVIDING DEVICE, INFORMATION PROVIDING METHOD AND COMPUTER-READABLE STORAGE MEDIUM

INCORPORATION BY REFERENCE

The disclosure of Japanese Patent Application No. 2010-176214 filed on Aug. 5, 2010 including the specification, drawings and abstract is incorporated herein by reference in its entirety.

BACKGROUND OF THE INVENTION

1. Field of the Invention

The present invention relates to an information providing device, an information providing method and a computer-readable storage medium.

2. Description of the Related Art

In an existing art, a fuel economy information providing system is suggested. The fuel economy information providing system guides a vehicle through a travel route that improves the fuel economy of the vehicle. For example, in the fuel economy information providing system, fuel economy information corresponding to a road condition for each vehicle type is stored in a database of an information center. When vehicle travel data and destination data are transmitted from a navigation device of a vehicle to the information center, the information center transmits a route having the highest fuel economy as a found result from among routes from a current location of the vehicle to a destination on the basis of the fuel economy information stored in the database. The navigation device carries out route guidance on the basis of the received result of route finding (for example, see Japanese Patent Application Publication No. 2005-163584 (JP-A-2005-163584)).

SUMMARY OF INVENTION

However, in the above existing system, a cost required for communication between the navigation device of the vehicle and the information center has not been considered at all. Therefore, there is a possibility that a communication cost exceeds the cost of fuel that may be saved through travelling along the route having the highest fuel economy, transmitted from the information center, and, as a result, it is difficult to reduce an economic burden on a user.

The present invention provides an information providing device, information providing method and information providing program that are able to take into consideration the cost of fuel that may be saved through travelling along a fuel-saving travel route and the cost of communication between a terminal device and the information providing device and that are able to suppress an increase in the economic burden on a user irrespective user's intention.

A first aspect of the invention relates to an information providing device that provides information to a terminal device. The information providing device includes: a route acquisition unit that acquires a reference travel route between two points on the basis of information about the reference travel route, transmitted from the terminal device; a route finding unit that finds a fuel-saving travel route between the two points; a fuel cost calculating unit that calculates a difference in cost of fuel between the reference travel route and the fuel-saving travel route on the basis of a fuel consumption for the reference travel route, a fuel consumption for the fuel-saving travel route and a fee of fuel; a communication cost calculating unit that calculates a communication cost for communicating first information about the fuel-saving travel route found by the route finding unit to the terminal device; and a control unit that executes control for transmitting predetermined information to the terminal device on the basis of a result of comparison between the difference in cost of fuel, calculated by the fuel cost calculating unit, and the communication cost calculated by the communication cost calculating unit.

A second aspect of the invention relates to an information providing method that provides information to a terminal device. The information providing method includes: acquiring a reference travel route between two points on the basis of information about the reference travel route, transmitted from the terminal device; finding a fuel-saving travel route between the two points; calculating a difference in cost of fuel between the reference travel route and the fuel-saving travel route on the basis of a fuel consumption for the reference travel route, a fuel consumption for the fuel-saving travel route and a fee of fuel; calculating a communication cost for communicating information about the found fuel-saving travel route to the terminal device; and executing control for transmitting predetermined information to the terminal device on the basis of a result of comparison between the calculated difference in cost of fuel and the calculated communication cost.

A third aspect of the invention relates to a computer-readable storage medium that stores computer-executable instructions for performing the information providing method according to the second aspect.

According to the first to third aspects, the predetermined information is transmitted to the terminal device on the basis of a result of comparison between the difference in cost of fuel, calculated by the fuel cost calculating unit, and the communication cost calculated by the communication cost calculating unit. Therefore, it is possible to take into consideration the cost of fuel that may be saved through travelling along a fuel-saving travel route and the cost of communication between the terminal device and the information providing device, so it is possible to suppress an increase in the economic burden on a user.

BRIEF DESCRIPTION OF DRAWINGS

The features, advantages, and technical and industrial significance of this invention will be described below with reference to the accompanying drawings, in which like numerals denote like elements, and wherein.

DETAILED DESCRIPTION OF EMBODIMENTS

Hereinafter, embodiments of an information providing device, an information providing method and a computer-readable storage medium according to the aspects of the present invention will be described in detail with reference to the accompanying drawings. However, the aspects of the invention are not limited to these embodiments.

First Embodiment

First, a first embodiment will be described. In the present embodiment, control for transmitting predetermined information to a terminal device is executed on the basis of the result of comparison between a savable fuel cost and a communication cost.

Figure 1:
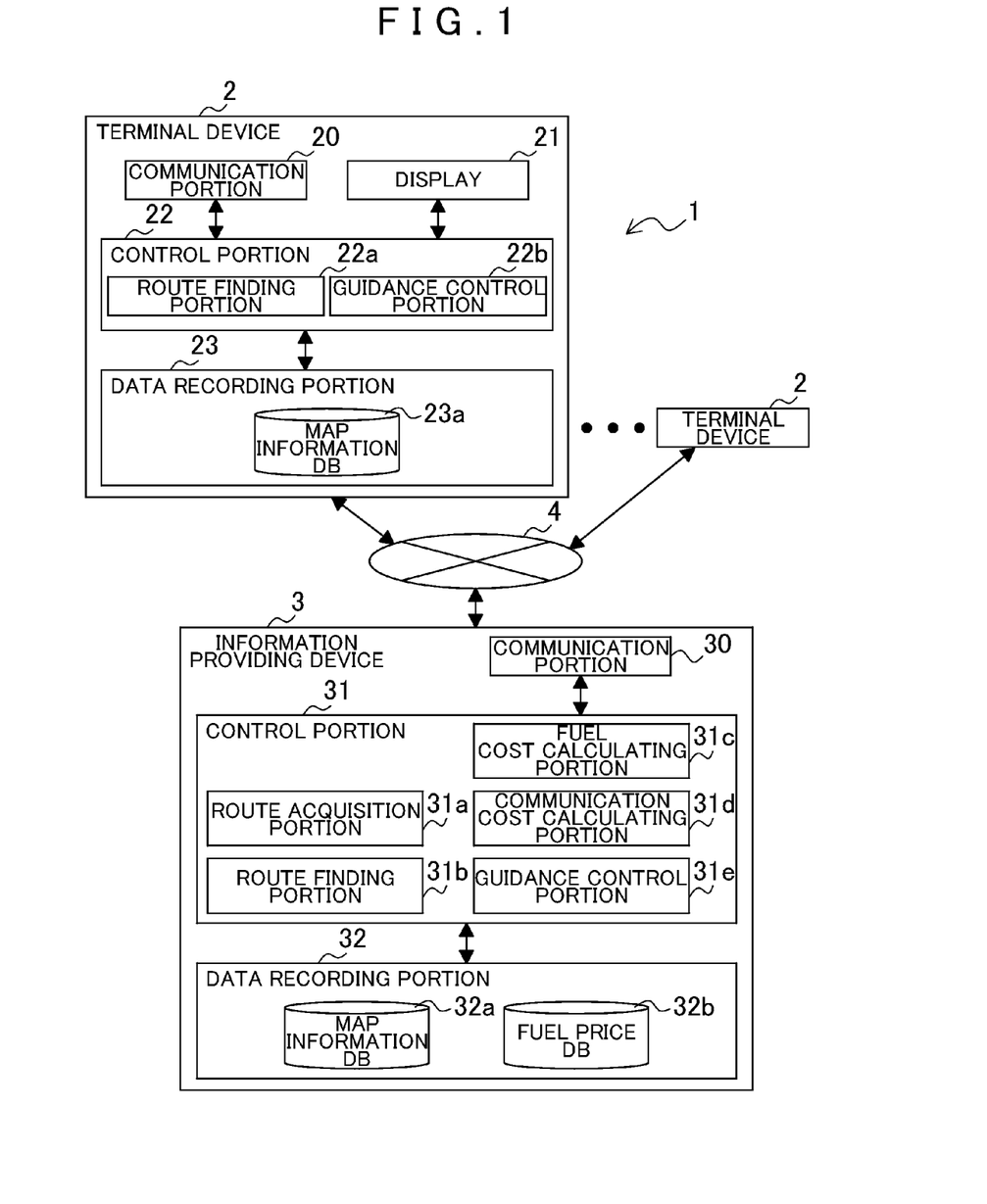
FIG. 1 is a block diagram that illustrates an information providing system according to a first embodiment.

Initially, the configuration of an information providing system according to the first embodiment will be described. FIG. 1 is a block diagram that illustrates the information providing system. As shown in FIG. 1, the information providing system 1 includes terminal devices 2 and an information providing device 3. These terminal devices 2 and information providing device 3 are communicably connected to each other via a network, such as a cellular phone network. Note that the following description assumes the case where each terminal device 2 is an in-vehicle navigation device and the information providing device 3 is arranged at a center that carries out communication with each navigation device.

Each terminal device 2 includes a communication portion 20, a display 21, a control portion 22 and a data recording portion 23.

The communication portion 20 functions as a communication unit that carries out communication with the information providing device 3 via a network 4. A known wireless communication device may be used as the communication portion 20.

The display 21 functions as a display unit that shows various images on the basis of control of the control portion 22. Note that a specific configuration of the display 21 is selectable, and a known flat panel display, such as a liquid crystal display and an organic EL display, may be used as the display 21.

The control portion 22 functions as a control unit that controls the terminal devices 2. Specifically, the control portion 22 is a computer that is formed of a CPU, various programs (including a basic control program, such as an operating system (OS) and an application program that is launched on the OS to implement a specific function) that are interpreted and executed on the CPU, and an internal memory, such as a RAM for storing the programs and various pieces of data. Particularly, an information providing program recorded in a computer-readable storage medium according to the first embodiment is installed into the information providing system 1 via a selected recording medium or the network 4 to thereby substantially constitute units of the control portion 22 (this also applies to a control portion 31 of the information providing device 3, which will be described layer).

The control portion 22 conceptually includes a route finding portion 22a and a guidance control portion 22b as functions. The route finding portion 22a finds a travel route between two points. In the following description, the travel route found by the route finding portion 22a of the terminal device 2 is termed a "reference travel route". The guidance control portion 22b functions as a guidance control unit that executes output control of guidance based on the information received from the information providing device 3 via the communication portion 20. The details of processes executed by these components of the control portion 22 will be described later.

The data recording portion 23 functions as a recording unit that records programs and various data required to operate the terminal device 2. For example, a hard disk (not shown) that serves as an external recording device is used as the data recording portion 23. However, instead of a hard disk or in addition to a hard disk, another selected recording medium, including a magnetic recording medium, such as a magnetic disk, and an optical recording medium, such as a DVD and a Blu-ray Disc, may be used (this also applies to a data recording portion 32 of the information providing device 3, which will be described later).

The data recording portion 23 includes a map information database 23a (hereinafter, the database is referred to as "DB"). The map information DB 23a functions as a map information storage unit that stores map information. The "map information", for example, includes link data (link numbers, connection node numbers, road coordinates, road types, numbers of lanes, traffic regulations, and the like), node data (node numbers and coordinates), object data (traffic lights, road signs, guardrails, buildings, and the like), facility data that include the point of interest (POI) information of facilities, such as shops, topographic data, map display data for showing a map on the display 21, and the like.

The information providing device 3 provides information to the terminal devices 2. The information providing device 3 includes a communication portion 30, the control portion 31 and the data recording portion 32.

The communication portion 30 is a communication unit that carries out communication with the terminal device 2 via the network 4. A known communication device may be used as the communication portion 30.

The control portion 31 of the information providing device 3 includes a route acquisition portion 31a, a route finding portion 31b, a fuel cost calculating portion 31c, a communication cost calculating portion 31d and a guidance control portion 31e. The route acquisition portion 31a functions as a route acquisition unit that acquires a reference travel route between two points on the basis of information about the reference travel route, transmitted from each terminal device 2. The route finding portion 31b functions as a route finding unit that finds a fuel-saving travel route between the two points. The route finding portion 31b finds a travel route on the basis of a route finding method similar to that of the route finding portion 22a of each of the above described terminal devices 2. The fuel cost calculating portion 31c functions as a fuel cost calculating unit that calculates a difference in fuel cost between the reference travel route and the fuel-saving travel route. The communication cost calculating portion 31d functions as a communication cost calculating unit that calculates a communication cost for communicating information about the fuel-saving travel route to the terminal device 2. The guidance control portion 31e functions as a control unit that executes control for transmitting information to the terminal devices 2. The detailed processes executed by these components of the control portion 31 will be described later.

The data recording portion 32 of the information providing device 3 includes a map information DB 32a and a fuel price DB 32b. The map information DB 32a stores fuel consumption information that determines a fuel consumption for each road link in addition to map information similar to the map information DB 23a of each terminal device 2. The information providing device 3 collects the fuel consumption information from each vehicle as probe information. The fuel consumption information is, for example, information based on the amount of fuel actually consumed by a vehicle that has travelled along a road corresponding to each road link. Furthermore, the fuel consumption information may include information that determines the type of a vehicle that transmits the information and weather, weekday, a time slot, and the like, that the vehicle has travelled along a road.

Figure 2:
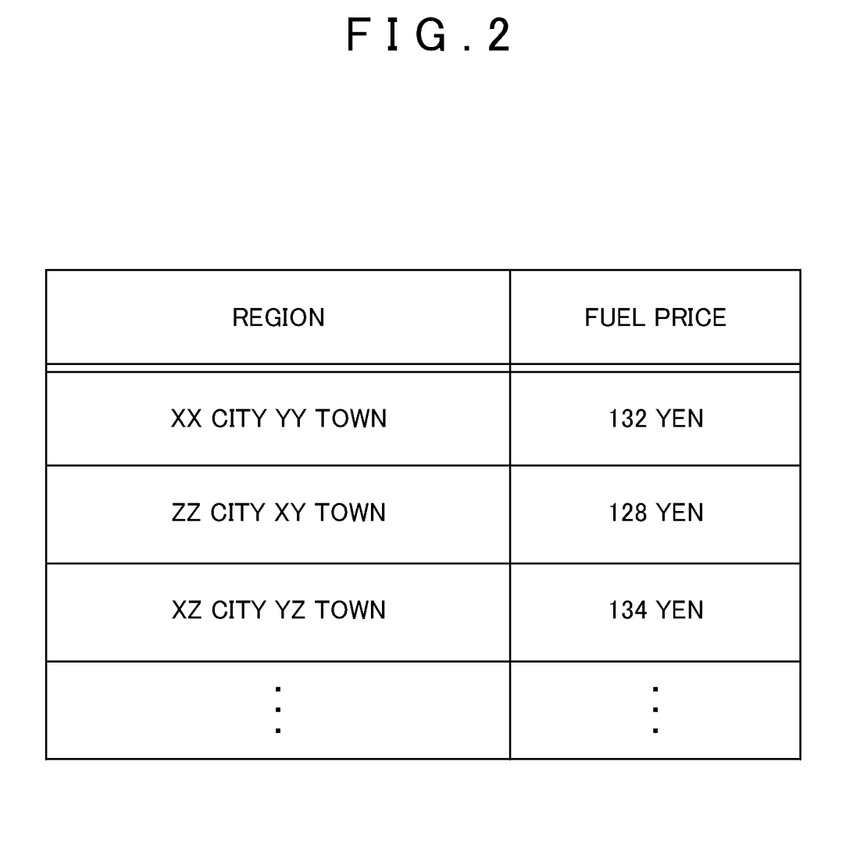
FIG. 2 is a table that illustrates information stored in a fuel price DB.

The fuel price DB 32b functions as a fuel price information storage unit that stores fuel price information that determines the price of fuel and region information that determines a region in which fuel is on sale in association with each other. FIG. 2 is a table that illustrates information stored in the fuel price DB 32b. As shown in FIG. 2, the fuel price DB 32b stores pieces of information corresponding to items "region" and "fuel price" in association with each other. The information stored in correspondence with the item "region" is region information that determines a region in which fuel is on sale. The information stored in correspondence with the item "fuel price" is fuel price information that determines the price of fuel. For example, the average price of fuel per liter in a corresponding region is used as the fuel price information. These region information and fuel price information are, for example, stored in the fuel price DB 32b by the administrator of the information providing device 3. Alternatively, it is also applicable that information that determines a fuel price and a gas filling station is received by the information providing device 3 via a cellular phone, or the like, from a driver who refueled a vehicle and then the average fuel price of each region is calculated on the basis of the received information to store the corresponding information in the fuel price DB 32b.

Figure 3:
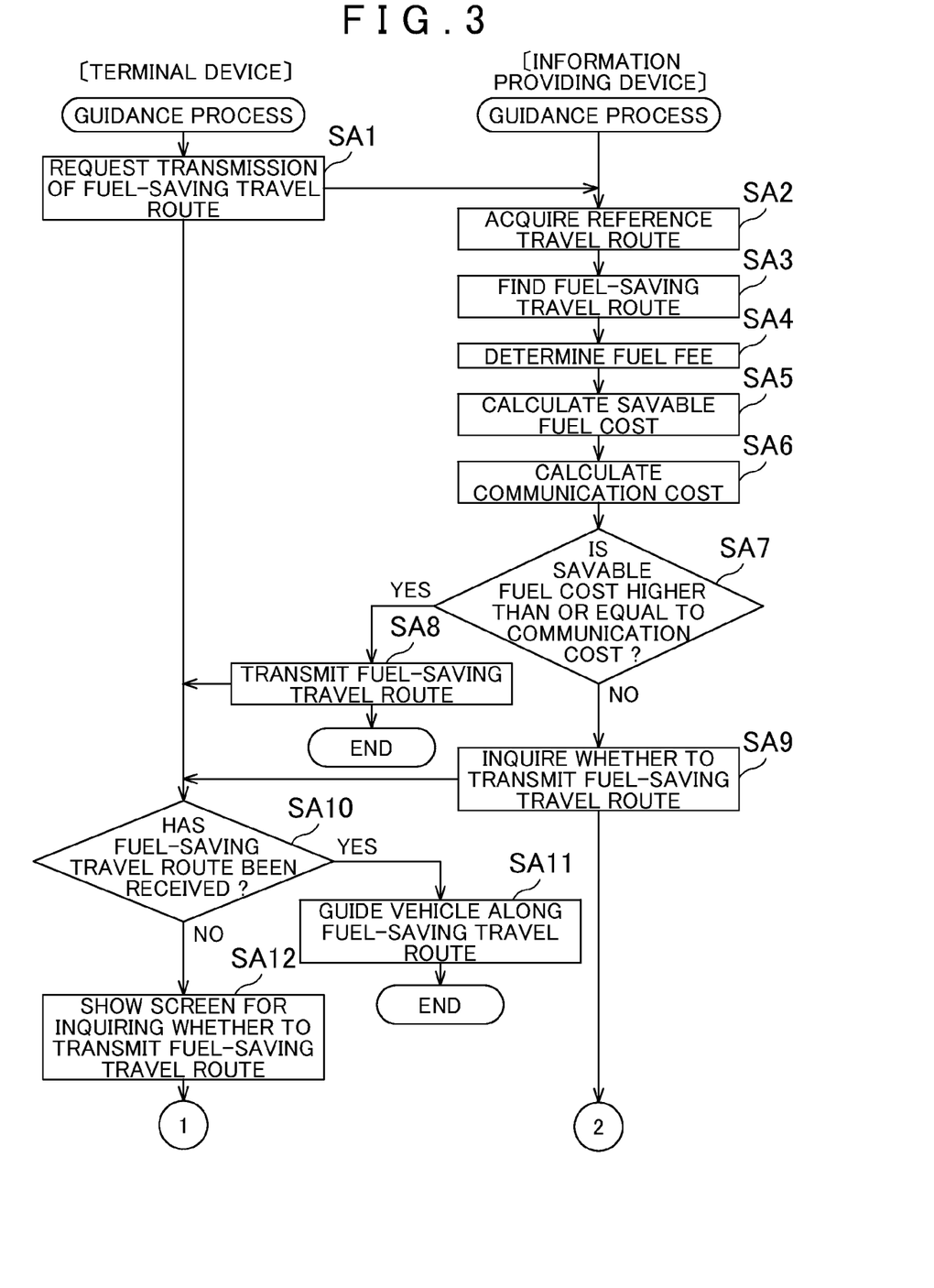
FIG. 3 is a flowchart of a guidance process.
Figure 4:
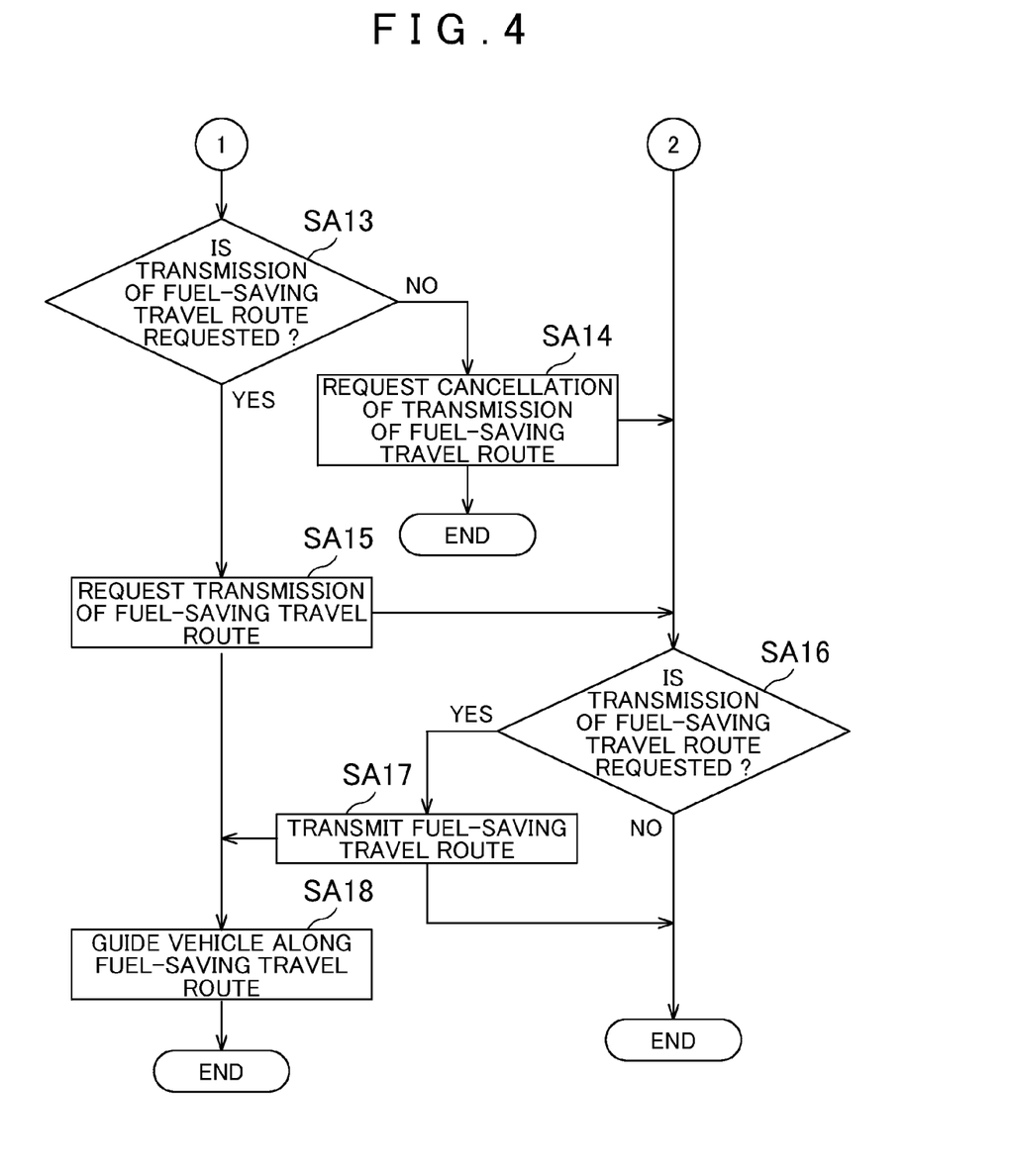
FIG. 4 is a flowchart of the guidance process subsequent to FIG. 3.

Next, a guidance process executed by the thus configured information providing system 1 will be described. FIG. 3 is a flowchart of the guidance process and FIG. 4 is a flowchart of the guidance process subsequent to FIG. 3 (in the following description of the processes, step is abbreviated as "S"). The guidance process is, for example, started on the condition that a command to find a travel route between two points (for example, between a current location and a destination or between a departure place and a destination) is input to a terminal device 2 via an operating unit (not shown), the route finding portion 22a of the terminal device 2 finds a reference travel route between the two points, and then a command to acquire a fuel-saving travel route is input via the operating unit. Note that, in the following description, the start point and end point of a reference travel route are collectively referred to as "two points".

As the guidance process is started, the guidance control portion 22b of the terminal device 2 transmits a signal for requesting transmission of information about a fuel-saving travel route to the information providing device 3 via the communication portion 20 (SA1). At this time, the guidance control portion 22b transmits the signal including information about the reference travel route between the two points. The information about the reference travel route between the two points includes information that determines the two points, information that determines the finding condition (for example, "recommended route", "distance priority route", "time priority route", or the like) of the reference travel route, the version information of the map information DB 23a, and the like.

The route acquisition portion 31a of the information providing device 3 acquires the reference travel route on the basis of the information about the reference travel route between the two points, received from the terminal device 2 via the communication portion 30 (SA2). For example, the route acquisition portion 31a acquires map information of the same version as that of the map information stored in the map information DB 23a of the terminal device 2 from the map information DB 32a on the basis of the information about the reference travel route between the two points, received from the terminal device 2, and then finds the reference travel route between the two points on the same finding condition as that used in the terminal device 2.

Subsequently, the route finding portion 31b finds a fuel-saving travel route between the start point and end point of the reference travel route (SA3). Specifically, the route finding portion 31b determines the fuel consumption of each of road links that constitute the reference travel route acquired by the route acquisition portion 31a on the basis of the fuel consumption information to thereby calculate the fuel consumption of the overall reference travel route. Then, the route finding portion 31b finds a fuel-saving travel route that is a route (detour) different from the reference travel route and that is able to reduce the fuel consumption as compared with the reference travel route using the fuel consumption information. A known route finding algorithm, such as a Dijkstra method, may be used for the finding.

After that, the fuel cost calculating portion 31c consults the fuel price DB 32b to determine a fuel fee on the basis of the fuel price information corresponding to a region that includes any one of the start point and end point of the reference travel route (SA4). For example, when the region that includes the start point of the reference travel route is XX city YY town, the fuel fee is determined as 132 yen per liter in accordance with the fuel price DB 32b shown in FIG. 2.

Referring back to FIG. 3, the fuel cost calculating portion 31c calculates a difference between the reference travel route and the fuel-saving travel route on the basis of the fuel consumptions calculated in SA3 respectively for the reference travel route and the fuel-saving travel route and the fuel fee determined in SA4 (SA5). The difference in fuel cost corresponds to the cost of fuel that may be saved when the vehicle travels along the fuel-saving travel route as compared with when the vehicle travels along the reference travel route. That is, the fuel cost calculating portion 31c calculates the cost of fuel when the vehicle travels along the reference travel route and the cost of fuel when the vehicle travels along the fuel-saving travel route on the basis of the fuel consumption for the reference travel route, the fuel consumption for the fuel-saving travel route and the fuel fee. Then, by obtaining the difference between both of the calculated cost, the cost of fuel that may be saved when the vehicle travels along the fuel-saving travel route as compared with when the vehicle travels along the reference travel route is calculated.

Subsequently, the communication cost calculating portion 31d calculates a communication cost for communicating the information about the fuel-saving travel route found by the route finding portion 31b to the terminal device 2 (SA6). Specifically, the communication cost calculating portion 31d acquires contract information that determines the contract details of the fee of communication between the terminal device 2 and the information providing device 3 and then calculates a communication cost on the basis of the acquired contract information. The contract information, for example, includes information that determines a carrier that provides communication lines, information that determines lines a contracted plan, such as a flat rate and a metered rate, information that determines a communication fee per unit amount of information (for example, one packet, or the like), and the like. The communication cost calculating portion 31d calculates a communication cost on the basis of these pieces of contract information and the data size of information communicated between the terminal device 2 and the information providing device 3. Note that the contract information is, for example, included in the signal for requesting transmission of information about a fuel-saving travel route and is transmitted from the terminal device 2 in SA1.

In addition, the "communication cost" includes various costs required for communication between the terminal device 2 and the information providing device 3 in the guidance process. That is, the "communication cost" includes a communication cost when the signal for requesting transmission of information about a fuel-saving travel route in SA1 is transmitted from the terminal device 2 to the information providing device 3 and a communication cost when information for determining the fuel-saving travel route is transmitted from the information providing device 3 to the terminal device 2. Furthermore, the "communication cost" further includes a communication cost when information that is transmitted to the terminal device 2 on the basis of the result of comparison between the savable fuel cost calculated by the fuel cost calculating portion 31c in SA5 and the communication cost calculated by the communication cost calculating portion 31d in SA6 and that is other than information for determining the fuel-saving travel route, that is, (for example, information for inquiring whether to transmit information for determining the fuel-saving travel route) is transmitted from the information providing device 3 to the terminal device 2. Furthermore, the "communication cost" also includes a communication cost when the terminal device 2 requires the information providing device 3 to transmit information for determining the fuel-saving travel route in response to information, other than information for determining the fuel-saving travel route, transmitted to the terminal device 2 or a communication cost when the terminal device 2 requires the information providing device 3 to cancel transmission of information for determining the fuel-saving travel route.

Subsequently, the guidance control portion 31e determines whether the savable fuel cost calculated by the fuel cost calculating portion 31c in SA5 is higher than or equal to the communication cost calculated by the communication cost calculating portion 31d in SA6 (SA7).

As a result, when the savable fuel cost calculated by the fuel cost calculating portion 31c in SA5 is higher than or equal to the communication cost calculated by the communication cost calculating portion 31d in SA6 (Yes in SA7), the guidance control portion 31e transmits information for determining the fuel-saving travel route to the terminal device 2 via the communication portion 30 (SA8), and then ends the guidance process. The information for determining the fuel-saving travel route, for example, includes like data, such as the link numbers of links that constitute the fuel-saving travel route and the link cost of each link. When the link cost of the fuel-saving travel route is, for example, set at 0, the route finding portion 22a of the terminal device 2 performs route finding using these pieces of link data to thereby make it possible to acquire the fuel-saving travel route.

On the other hand, when the savable fuel cost calculated by the fuel cost calculating portion 31c in SA5 is not higher than or equal to the communication cost calculated by the communication cost calculating portion 31d in SA6 (when the savable fuel cost is lower than the communication cost) (No in SA7), the guidance control portion 31e transmits information for inquiring whether to transmit information for determining the fuel-saving travel route to the terminal device 2 via the communication portion 30 (SA9). The information for inquiring whether to transmit information for determining the fuel-saving travel route, for example, includes information that determines the savable fuel cost calculated by the fuel cost calculating portion 31c in SA5 and information that determines the communication cost calculated by the communication cost calculating portion 31d in SA6.

The guidance control portion 22b of the terminal device 2 determines whether information for determining the fuel-saving travel route is received from the information providing device 3 via the communication portion 20 (SA10).

As a result, when the information for determining the fuel-saving travel route is received from the information providing device 3 via the communication portion 20 (Yes in SA10), the guidance control portion 22b guides the vehicle along the fuel-saving travel route on the basis of the received information (SA11). For example, when link data, such as the link numbers of links that constitute the fuel-saving travel route and the link cost of each link, are received from the information providing device 3 as the information for determining the fuel-saving travel route, the guidance control portion 22b causes the route finding portion 22a to find the route between the two points on the basis of the received link data. Then, the guidance control portion 22b causes the display 21 to show the route obtained through route finding performed by the route finding portion 22a as the fuel-saving travel route. After guiding the vehicle along the fuel-saving travel route, the control portion 22 of the terminal device 2 ends the guidance process.

Figure 5:
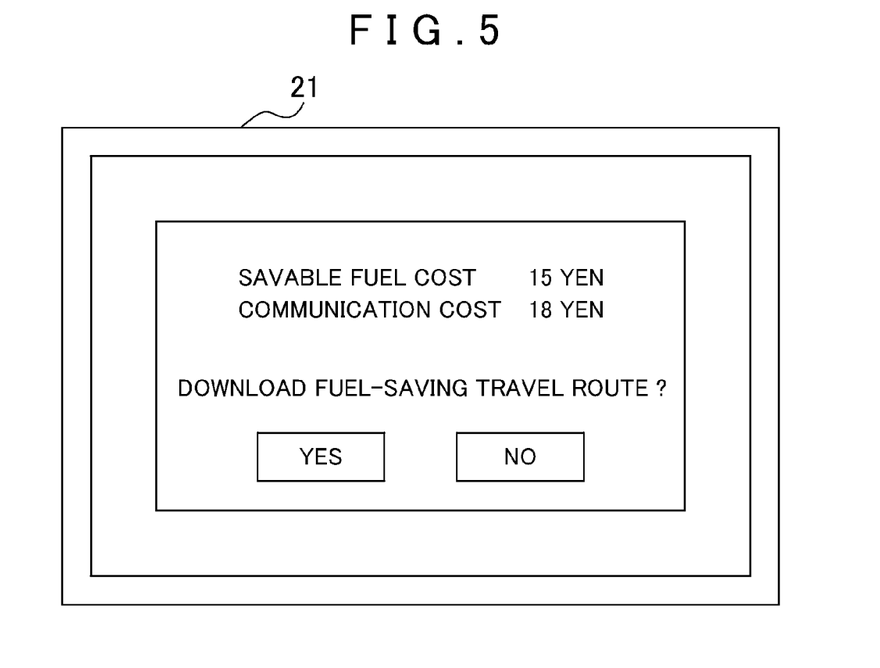
FIG. 5 is view that illustrates a display that shows information for inquiring whether to transmit information for determining a fuel-saving travel route.

On the other hand, when the information for determining the fuel-saving travel route is not received from the information providing device 3 via the communication portion 20 (No in SA10), that is, when information for inquiring whether to transmit the information for determining the fuel-saving travel route is received via the communication portion 20, the guidance control portion 22b causes the display 21 to show the received information for inquiring whether to transmit the information for determining the fuel-saving travel route (SA12). FIG. 5 is a view that illustrates the display 21 showing information for inquiring whether to transmit information for determining the fuel-saving travel route. As shown in FIG. 5, the guidance control portion 22b causes the display 21 to show the savable fuel cost calculated by the fuel cost calculating portion 31c in SA5, the communication cost calculated by the communication cost calculating portion 31d in SA6 and alternatives for whether to download the fuel-saving travel route.

Subsequently, the guidance control portion 22b determines whether a transmission of the information for determining the fuel-saving travel route is requested via the operating unit of the terminal device 2, that is, whether any one of a transmission of the information for determining the fuel-saving travel route and a cancellation of the transmission is requested (SA13).

As a result, when a transmission of the information for determining the fuel-saving travel route is not requested (a cancellation of the transmission is requested) via the operating unit of the terminal device 2 (No in SA13), the guidance control portion 22b transmits a signal for requesting a cancellation of the transmission of the information for determining the fuel-saving travel route to the information providing device 3 via the communication portion 20 (SA14), and then ends the guidance process.

On the other hand, when a transmission of the information for determining the fuel-saving travel route is requested via the operating unit of the terminal device 2 (Yes in SA13), the guidance control portion 22b transmits a signal for requesting a transmission of the information for determining the fuel-saving travel route to the information providing device 3 via the communication portion 20 (SA15).

The guidance control portion 31e of the information providing device 3 determines whether the signal for requesting a transmission of the information for determining the fuel-saving travel route is received from the terminal device 2 via the communication portion 30 (SA16). As a result, when the signal for requesting a transmission of the information for determining the fuel-saving travel route is received from the terminal device 2 via the communication portion 30 (Yes in SA16), the information for determining the fuel-saving travel route is transmitted to the terminal device 2 via the communication portion 30 (SA17), and then the guidance process is ended.

On the other hand, when the signal for requesting a transmission of the information for determining the fuel-saving travel route is not received from the terminal device 2 via the communication portion 30 (No in SA16), that is, when the signal for requesting a cancellation of transmission of the information for determining the fuel-saving travel route is received from the terminal device 2 via the communication portion 30, the control portion 31 of the information providing device 3 ends the guidance process.

After receiving the information for determining the fuel-saving travel route, transmitted from the information providing device 3 in SA17, via the communication portion 20, the guidance control portion 22b of the terminal device 2 guides the vehicle along the fuel-saving travel route on the basis of the received information (SA18). After that, the control portion 22 of the terminal device 2 ends the guidance process.

In this way, according to the first embodiment, predetermined information is transmitted to the terminal device 2 on the basis of the result of comparison between the difference between the fuel costs calculated by the fuel cost calculating portion 31c and the communication cost calculated by the communication cost calculating portion 31d. Therefore, it is possible to take into consideration the savable fuel cost through travelling along the fuel-saving travel route and the cost of communication between the terminal device 2 and the information providing device 3, so it is possible to suppress an increase in the economic burden on a user.

Particularly, when the difference between the fuel costs calculated by the fuel cost calculating portion 31c is higher than or equal to the communication cost calculated by the communication cost calculating portion 31d, information about the fuel-saving travel route is transmitted to the terminal device 2. Therefore, it is possible to suppress an excess of the cost of communication between the terminal device 2 and the information providing device 3 over the savable fuel cost through travelling along the fuel-saving travel route, so it is possible to suppress an increase in the economic burden on a user.

In addition, contract information that determines the contract details of the fee of communication between the terminal device 2 and the information providing device 3 is acquired and then a communication cost is calculated on the basis of the acquired contract information, so it is possible to further accurately calculate a communication cost in accordance with the contract details of each user.

In addition, the communication cost includes a communication cost when information, which is transmitted to the terminal device 2 on the basis of the result of comparison between the difference between the fuel costs calculated by the fuel cost calculating portion 31c and the communication cost calculated by the communication cost calculating portion 31d and which is other than information for determining the fuel-saving travel route, is transmitted to the terminal device 2, specifically, information for inquiring whether to transmit information for determining the fuel-saving travel route, a communication cost when information is transmitted from the terminal device 2 to the information providing device 3 in response to information, other than information for determining the fuel-saving travel route, transmitted to the terminal device 2, specifically, a communication cost when a transmission of information for determining the fuel-saving travel route is requested or a communication cost when a cancellation of transmission of information for determining the fuel-saving travel route from the terminal device 2 to the information providing device 3 is requested. Therefore, the overall cost required for communication between the terminal device 2 and the information providing device 3 is considered, and, when the savable fuel cost through travelling along the fuel-saving travel route still exceeds the communication cost, it is possible to guide the vehicle along the fuel-saving travel route, so it is possible to reduce the economic burden on a user.

In addition, a fuel fee is determined on the basis of the fuel price information corresponding to a region that includes any one of the two points, so it is possible to further accurately calculate the cost of fuel that may be saved through travelling along the fuel-saving travel route as compared with travelling along the reference travel route.

Second Embodiment

Next, a second embodiment will be described. In this embodiment, only information about a reference travel route between two points, which is different from a reference travel route between two points, previously transmitted to the information providing device 3, is transmitted to the information providing device 3. Note that the configuration of the second embodiment is substantially the same as the configuration of the first embodiment unless otherwise specified, like reference numerals and/or names used in the first embodiment denote substantially the same components as those of the first embodiment where appropriate, and the description thereof is omitted.

Figure 6:
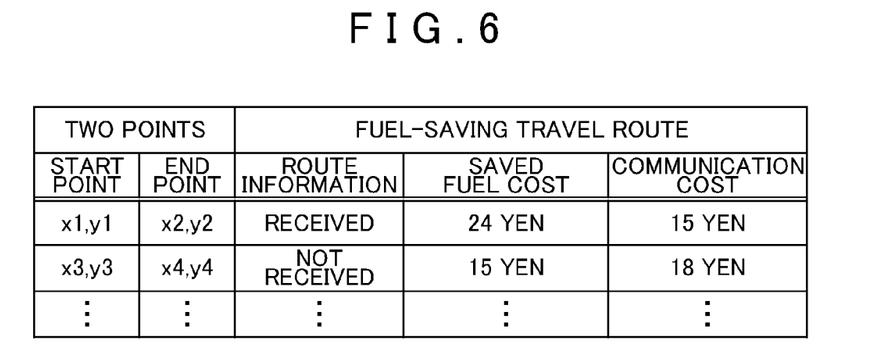
FIG. 6 is a table that illustrates information stored in a fuel-saving travel route DB.

First, the configuration of the information providing system 1 according to the second embodiment will be described. A data recording portion 23 of each terminal device 2 has a similar configuration to that of the data recording portion 23 of each terminal device 2 in the first embodiment, and further includes a fuel-saving travel route DB (not shown). FIG. 6 is a table that illustrates information stored in the fuel-saving travel route DB. The fuel-saving travel route DB stores information about fuel-saving travel routes that the terminal device 2 has previously received from the information providing device 3 via the communication portion 20, and stores pieces of information corresponding to items "two points" and "fuel-saving travel route" in association with each other as shown in FIG. 6. Information stored in correspondence with the item "two points" is information for determining two points among pieces of information about reference travel routes between two points, previously transmitted from the terminal device 2 to the information providing device 3, and, for example, stores coordinate information corresponding to detailed items "start point" and "end point" ("x1, y1", and the like, in FIG. 6) as shown in FIG. 6. Information stored in correspondence with the item "fuel-saving travel route" is information about fuel-saving travel routes that the terminal device 2 has previously received from the information providing device 3 via the communication portion 20, and stores pieces of information corresponding to detailed items "route information", "saved fuel cost" and "communication cost". Information stored in correspondence with the detailed item "route information" is information for determining whether the terminal device 2 has received information for determining a fuel-saving travel route from the information providing device 3 ("received", "not received" in FIG. 6). Information stored in correspondence with the detailed item "saved fuel cost" is information included in information for inquiring whether to transmit information for determining a fuel-saving travel route, that the terminal device 2 has received from the information providing device 3, and is information that determines a savable fuel cost calculated by the fuel cost calculating portion 31c ("24 yen", "15 yen" in FIG. 6). Information stored in correspondence with the detailed item "communication cost" is information that is included in information for inquiring whether to transmit information for determining a fuel-saving travel route and that the terminal device 2 has received from the information providing device 3, and is information that determines a communication cost calculated by the communication cost calculating portion 31d ("15 yen", "18 yen" in FIG. 6). These pieces of information are stored in the fuel-saving travel route DB by the control portion 22 of the terminal device 2 when the terminal device 2 receives information about a fuel-saving travel route from the information providing device 3.

Figure 7:
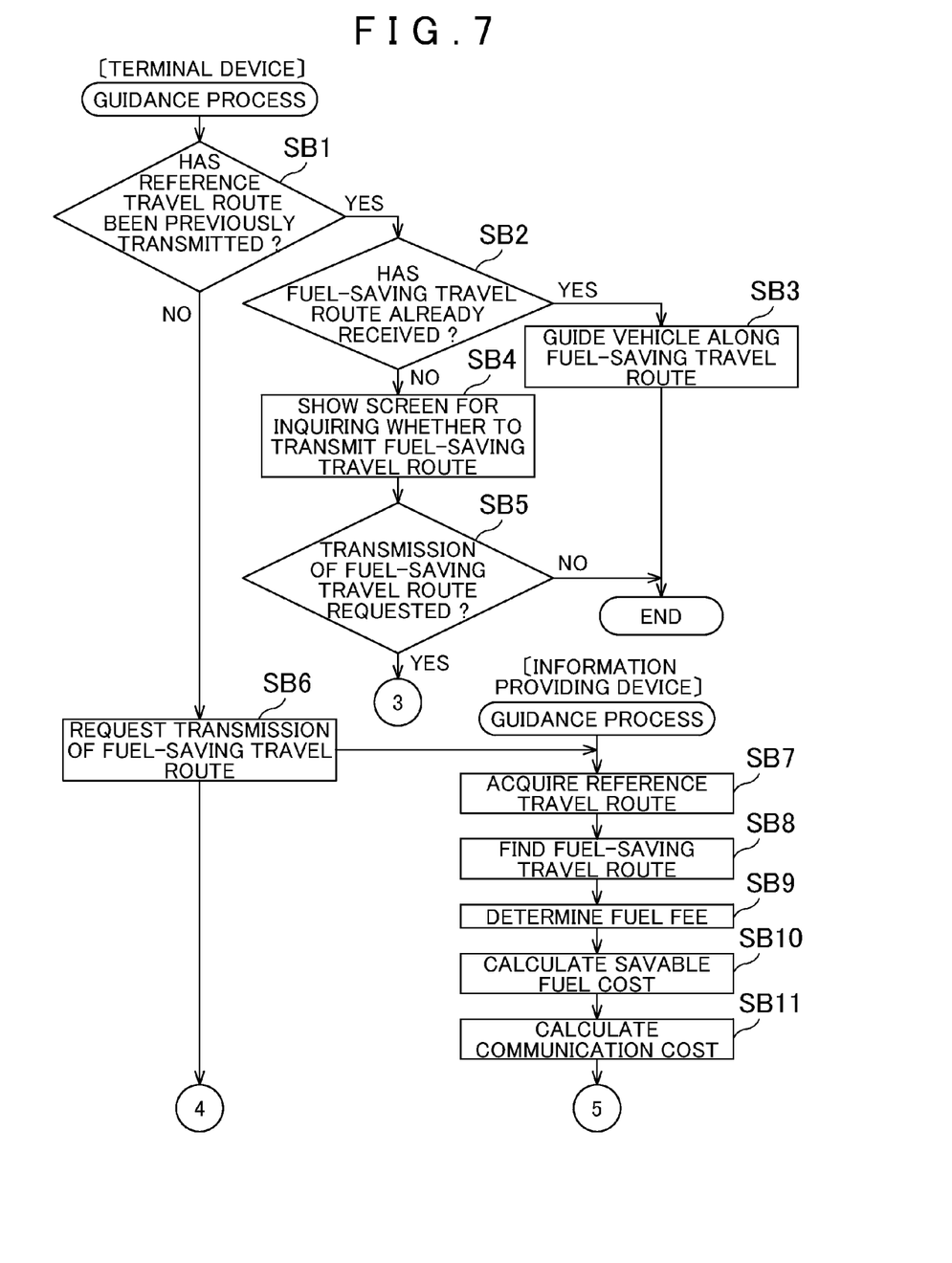
FIG. 7 is a flowchart of a guidance process according to a second embodiment.
Figure 8:
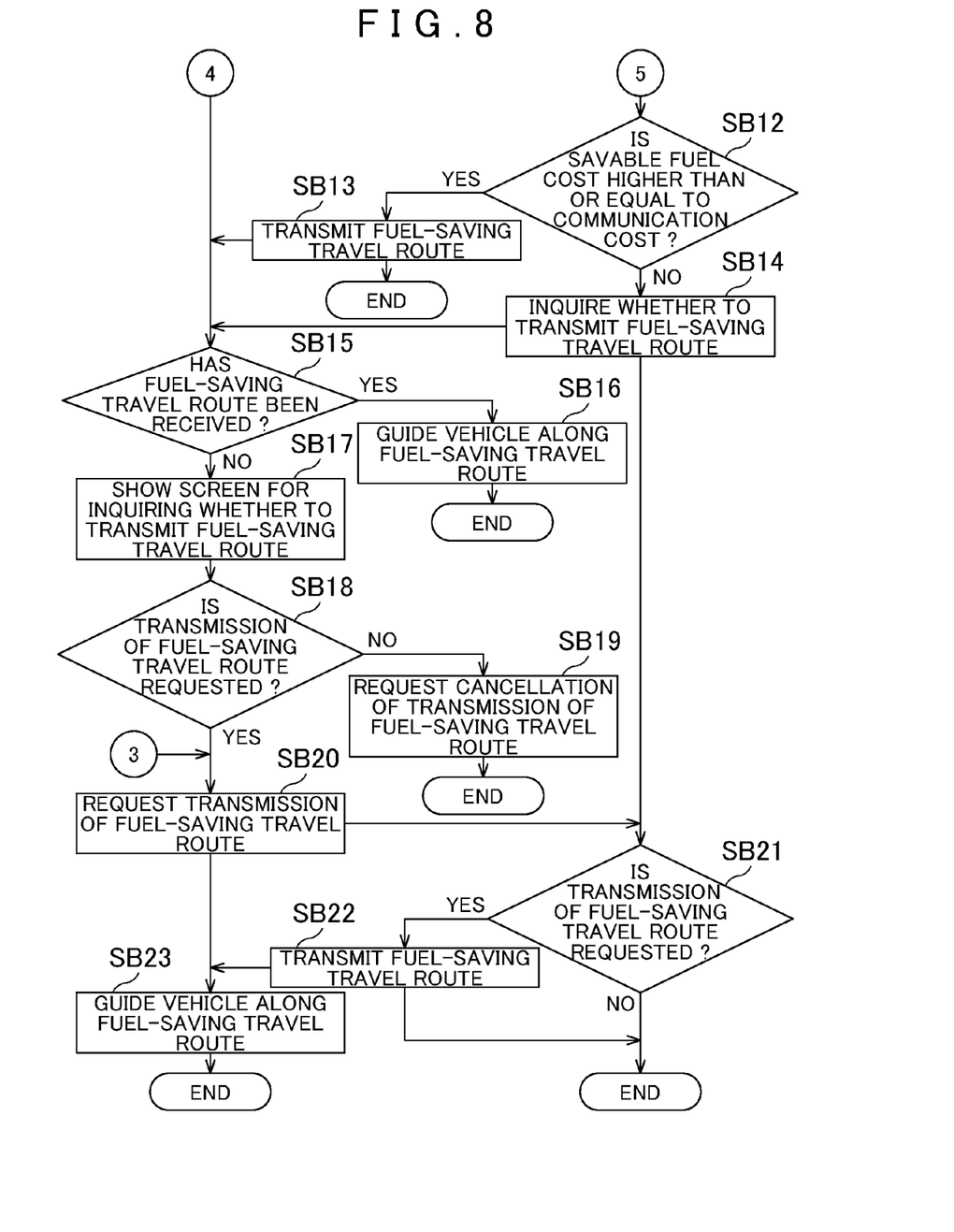
FIG. 8 is a flowchart of the guidance process subsequent to FIG. 7.

Next, a guidance process executed by the information providing system 1 according to the second embodiment will be described. FIG. 7 and FIG. 8 illustrate a flowchart of the guidance process according to the second embodiment. Note that SB6 to SB15 are the same as SA1 to SA10 in FIG. 3 and SB18 to SB23 are the same as SA13 to SA18 in FIG. 4, so the description thereof is omitted.

As the guidance process is started, the guidance control portion 22b of the terminal device 2 determines whether information about a reference travel route between two points, found by the route finding portion 22a, has been previously transmitted to the information providing device 3 (SB1). Specifically, the guidance control portion 22b determines that information about a reference travel route between two points, found by the route finding portion 22a, has been previously transmitted to the information providing device 3 when the information that determines two points of the reference travel route found by the route finding portion 22a is stored in correspondence with the item "two points" of the fuel-saving travel route DB.

As a result, when the information about the reference travel route between the two points, found by the route finding portion 22a, has been previously transmitted to the information providing device 3 (Yes in SB1), the guidance control portion 22b determines whether the terminal device 2 has already received information for determining a fuel-saving travel route between the two points from the information providing device 3 on the basis of the information stored in correspondence with the detailed item "route information" of the fuel-saving travel route DB (SB2).

As a result, when the terminal device 2 has already received information for determining a fuel-saving travel route between the two points from the information providing device 3 (Yes in SB2), the guidance control portion 22b guides the vehicle along the fuel-saving travel route on the basis of the previously received information for determining the fuel-saving travel route between the two points (SB3). Note that it is assumed that previously received information for determining a fuel-saving travel route between two points is recorded in the data recording portion 23 in association with the two points.

On the other hand, when the terminal device 2 has not received (has not yet received) information for determining a fuel-saving travel route between the two points from the information providing device 3 (No in SB2), the guidance control portion 22b causes the display 21 to show information for inquiring whether to transmit information for determining a fuel-saving travel route (SB4). In this case, the guidance control portion 22b causes the display 21 to show alternatives of whether to download a savable fuel cost, a communication cost and a fuel-saving travel route on the basis of pieces of information stored in correspondence with the detailed items "saved fuel cost" and "communication cost" of the fuel-saving travel route DB.

Subsequently, the guidance control portion 22b determines whether a transmission of information for determining a fuel-saving travel route is requested via the operating unit (not shown) of the terminal device 2 (SB5).

As a result, when a transmission of information for determining a fuel-saving travel route is not requested via the operating unit of the terminal device 2 (No in SB5), the control portion 22 of the terminal device 2 ends the guidance process.

On the other hand, when a transmission of information for determining a fuel-saving travel route is requested via the operating unit of the terminal device 2 (Yes in SB5), the guidance control portion 22b transmits a signal for requesting a transmission of information for determining a fuel-saving travel route to the information providing device 3 via the communication portion 20 (SB20).

When information for determining a fuel-saving travel route is received from the information providing device 3 via the communication portion 20 in SB15 (Yes in SB15), the guidance control portion 22b guides the vehicle along the fuel-saving travel route on the basis of the received information (SB16), and records the received information for determining a fuel-saving travel route in association with the two points in the data recording portion 23.

On the other hand, when information for determining a fuel-saving travel route is not received from the information providing device 3 via the communication portion 20 (No in SB15), that is, when information for inquiring whether to transmit information for determining a fuel-saving travel route is received via the communication portion 20, the guidance control portion 22b causes the display 21 to show the received information for determining a fuel-saving travel route (SB17), and stores pieces of information that determine a savable fuel cost and a communication cost, included in the received information for inquiring whether to transmit information for determining a fuel-saving travel route, in the fuel-saving travel route DB in association with the two points.

In this way, according to the second embodiment, only information about a reference travel route between two points, which is different from a reference travel route between two points, previously transmitted to the information providing device 3, is transmitted to the information providing device 3. Therefore, it is possible to omit second communication for various pieces of information that have been already communicated between the terminal device 2 and the information providing device 3, so it is possible to further reduce the economic burden on a user.

Alternative Embodiments to First and Second Embodiments

The embodiments according to the aspects of the invention are described above; however, specific configuration and manner of the aspects of the invention may be selectively modified and improved within the scope of the technical idea of the invention recited in the appended claims. Hereinafter, such alternative embodiments will be described.

First, problems to be solved by the aspects of the invention and advantages of the aspects of the invention are not limited to those described above; they may vary depending on environments and/or details of configuration of the aspects of the invention, and only part of the above described problems may be solved or part of the above described advantages may be achieved.

In addition, the above described electrical components are functionally conceptual components, and need not be physically configured as shown in the drawings necessarily. That is, specific embodiments of separation or integration of components are not limited to those shown in the drawings; all or part of the components may be functionally or physically separated or integrated in a selected combination depending on various loads, usage conditions, and the like. For example, in the second embodiment, it is applicable that the fuel-saving travel route DB is provided in the data recording portion 32 of the information providing device 3 for each vehicle or each user and then it is determined whether the information providing device 3 has previously received information about a reference travel route between two points, found by the route finding portion 22a, from the terminal device 2.

In the above described embodiments, in SA1 of FIG. 3, contract information is, for example, included in a signal for requesting a transmission of information about a fuel-saving travel route and is transmitted from the terminal device 2. Instead, it is also applicable that contract information is recorded in the data recording portion 32 of the information providing device 3 for each user in advance and then corresponding contract information is acquired from the data recording portion 32 on the basis of identification information that uniquely identifies a user and that is transmitted from the terminal device 2, and the like. Alternatively, it is applicable that standard contract information common to users is recorded in the data recording portion 32 of the information providing device 3 in advance and then the standard contract information is used.

In addition, in the above described embodiments, in SA4 of FIG. 3, the fuel cost calculating portion 31c consults the fuel price DB 32b and then determines a fuel fee on the basis of fuel price information corresponding to a region that includes any one of the start point and end point of a reference travel route. Instead, it is also applicable that, for example, a fuel fee is determined on the basis of fuel price information corresponding to a region that includes all the points in a reference travel route or fuel-saving travel route. In this case, a fuel fee may be determined using a maximum fuel price, minimum fuel price, average fuel price, or the like, corresponding to all the points.

In addition, in the above described embodiments, the "communication cost" calculated by the communication cost calculating portion 31d in SA6 includes various costs required for communication between the terminal device 2 and the information providing device 3 in the guidance process; however, a communication cost when information, which is transmitted to the terminal device 2 on the basis of the result of comparison between a savable fuel cost calculated by the fuel cost calculating portion 31c in SA5 and a communication cost calculated by the communication cost calculating portion 31d in SA6 and which is other than information for determining a fuel-saving travel route, is transmitted from the information providing device 3 to the terminal device 2 may be excluded from the "communication cost" calculated by the communication cost calculating portion 31d. In addition, a communication cost when a transmission of information for determining a fuel-saving travel route from the terminal device 2 to the information providing device 3 is requested in response to information, other than information for determining a fuel-saving travel route, transmitted to the terminal device 2 and a communication cost when a cancellation of transmission of information for determining a fuel-saving travel route from the terminal device 2 to the information providing device 3 is requested may be excluded from the "communication cost" calculated by the communication cost calculating portion 31d.

In addition, in the above described embodiments, various DBs, and the like, are illustrated as a configuration example of the information providing system in Japan; however, in another country as well, DBs are constructed suitably for the country to thereby make it possible to implement the information providing system according to the aspects of the invention.

What is claimed is:

1. An information providing device that provides information to a terminal device, comprising:
    a route acquisition unit that acquires a reference travel route between two points on the basis of information about the reference travel route, transmitted from the terminal device;
    a route finding unit that finds a fuel-saving travel route between the two points;
    a fuel cost calculating unit that calculates a difference in cost of fuel between the reference travel route and the fuel-saving travel route on the basis of a fuel consumption for the reference travel route, a fuel consumption for the fuel-saving travel route and a fee of fuel;
    a communication cost calculating unit that calculates a communication cost for communicating first information about the fuel-saving travel route found by the route finding unit to the terminal device; and
    a control unit that executes control for transmitting predetermined information to the terminal device on the basis of a result of comparison between the difference in cost of fuel, calculated by the fuel cost calculating unit, and the communication cost calculated by the communication cost calculating unit,
    wherein the communication cost calculating unit acquires contract information that deters lines contract details of a fee of communication between the terminal device and the information providing device and then calculates the communication cost on the basis of the acquired contract information.

2. The information providing device according to claim 1, wherein
    when the difference in cost of fuel, calculated by the fuel cost calculating unit, is higher than or equal to the communication cost calculated by the communication cost calculating unit, the control unit executes control for transmitting the first information, as the predetermined information, to the terminal device.

3. The information providing device according to claim 2, wherein
    when the difference in cost of fuel, calculated by the fuel cost calculating unit, is lower than the communication cost calculated by the communication cost calculating unit, the control unit executes control for transmitting, to the terminal device, information for inquiring whether to transmit the first information.

4. The information providing device according to claim 1, wherein
    the communication cost includes
    the communication cost when second information, which is transmitted to the terminal device on the basis of a result of comparison between the difference in cost of fuel, calculated by the fuel cost calculating unit, and the communication cost calculated by the communication cost calculating unit and which is other than the first information, is transmitted to the terminal device; and
    the communication cost when third information is transmitted from the terminal device to the information providing device in response to the second information.

5. The information providing device according to claim 4, wherein the second information is information for inquiring whether to transmit the first information; and the third information is any one of information that requests transmission of the first information and information that requests a cancellation of transmission of the first information.

6. The information providing device according to claim 1, further comprising:
a fuel price information storage unit that stores fuel price information that determines a price of the fuel and region information that determines a region in which the fuel is on sale in association with each other, wherein
the fuel cost calculating unit determines the fee of the fuel on the basis of the fuel price information corresponding to a region that includes any one of the two points.

7. An information providing method that provides information to a terminal device, comprising:
acquiring a reference travel route between two points on the basis of information about the reference travel route, transmitted from the terminal device;
finding a fuel-saving travel route between the two points;
calculating a difference in cost of fuel between the reference travel route and the fuel-saving travel route on the basis of a fuel consumption for the reference travel route, a fuel consumption for the fuel-saving travel route and a fee of fuel;
calculating a communication cost for communicating information about the found fuel-saving travel route to the terminal device; and
executing, using a processor, control for transmitting predetermined information to the terminal device on the basis of a result of comparison between the calculated difference in cost of fuel and the calculated communication cost,
wherein the communication cost is calculated by acquiring contract information that determines contract details of a fee of communication between the terminal device and the information providing device and then calculating the communication cost on the basis of the acquired contract information.

8. A non-transitory computer-readable storage medium that stores computer-executable instructions for performing an information providing method, the method comprising:
acquiring a reference travel route between two points on the basis of information about the reference travel route, transmitted from the terminal device;
finding a fuel-saving travel route between the two points;
calculating a difference in cost of fuel between the reference travel route and the fuel-saving travel route on the basis of a fuel consumption for the reference travel route, a fuel consumption for the fuel-saving travel route and a fee of fuel;
calculating a communication cost for communicating information about the found fuel-saving travel route to the terminal device; and
executing control for transmitting predetermined information to tile terminal device on the basis of a result of comparison between the calculated difference in cost of fuel and tile calculated communication cost,
wherein the communication cost is calculated by acquiring contract information that determines contract details of a fee of communication between the terminal device and the information providing device and then calculating the communication cost on the basis of the acquired contract information.

* * * * *